US010888724B2

(12) United States Patent
Krøger et al.

(10) Patent No.: US 10,888,724 B2
(45) Date of Patent: Jan. 12, 2021

(54) OPTIMISING FIRE PROTECTION FOR AN OFFSHORE PLATFORM

(71) Applicant: Equinor Energy AS, Stavanger (NO)

(72) Inventors: Dagfinn Krøger, Stavanger (NO); Bjarne Alexander Solberg, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 16/330,843

(22) PCT Filed: Sep. 15, 2017

(86) PCT No.: PCT/NO2017/050230
§ 371 (c)(1),
(2) Date: Mar. 6, 2019

(87) PCT Pub. No.: WO2018/052314
PCT Pub. Date: Mar. 22, 2018

(65) Prior Publication Data
US 2019/0209882 A1 Jul. 11, 2019

(30) Foreign Application Priority Data
Sep. 15, 2016 (GB) .................................. 1615681.2

(51) Int. Cl.
*A62B 99/00* (2009.01)
*G06Q 10/10* (2012.01)
(Continued)

(52) U.S. Cl.
CPC ................ *A62C 35/00* (2013.01); *A62B 5/00* (2013.01); *A62C 2/04* (2013.01); *A62C 2/06* (2013.01);
(Continued)

(58) Field of Classification Search
CPC .... G06Q 50/265; G06Q 90/20; G06Q 90/205; A62C 35/00; A62C 2/04; A62C 2/06;
(Continued)

(56) References Cited

U.S. PATENT DOCUMENTS 2,767,802 A 10/1956 Orrell
3,001,595 A 9/1961 De Long Corp
(Continued)

FOREIGN PATENT DOCUMENTS

AU 2009100098 A4 4/2009
CN 202391346 U 8/2012
(Continued)

OTHER PUBLICATIONS

Ahmad et al., "A risk-based method for determining passive fire protection adequacy," Fire Safety Journal 58, 2013, pp. 160-169. (Year: 2013).*

(Continued)

*Primary Examiner* — Jonathan P Ouellette
(74) *Attorney, Agent, or Firm* — Eversheds Sutherland (US) LLP

(57) ABSTRACT

An offshore oil and gas platform has equipment and piping associated with an oil and gas installation. A method for optimising fire protection for the platform includes arranging the platform to have an evacuation time of at most 15 minutes or less using one or more evacuation route(s) via a gangway or bridge allowing personnel to escape to a vessel or to another platform, determining a maximum evacuation time for the platform, assessing the risk to personnel using the evacuation route(s) in accordance with the determined maximum evacuation time in the event of a fire, and providing passive fire protection to equipment and/or piping on the platform in order to prevent escalation of the fire that
(Continued)

would create a risk to personnel on the evacuation route(s) during the determined evacuation time.

14 Claims, 6 Drawing Sheets

(51) Int. Cl.

| | |
|---|---|
| ***G06Q 30/02*** | (2012.01) |
| ***G06Q 10/08*** | (2012.01) |
| ***G06Q 40/08*** | (2012.01) |
| ***A62C 35/00*** | (2006.01) |
| ***A62B 5/00*** | (2006.01) |
| ***E02B 17/00*** | (2006.01) |
| ***B63B 43/00*** | (2006.01) |
| ***B63B 35/44*** | (2006.01) |
| ***A62C 2/04*** | (2006.01) |
| ***A62C 2/06*** | (2006.01) |

(52) U.S. Cl.
CPC .......... *B63B 35/4413* (2013.01); *B63B 43/00* (2013.01); *E02B 17/0017* (2013.01); *B63B 2043/003* (2013.01)

(58) Field of Classification Search
CPC ....... A62B 5/00; E02B 17/0017; B63B 43/00; B63B 35/4413; B63B 2043/003
USPC .................................. 705/1.1–912, 323–325
See application file for complete search history.

(56) References Cited

U.S. PATENT DOCUMENTS

| | | | | | |
|---|---|---|---|---|---|
| 4,100,752 | A | | 7/1978 | Tucker | |
| 4,130,076 | A | | 12/1978 | van Bilderbeek | |
| 4,203,504 | A | * | 5/1980 | Reynoir | A62B 1/00 182/10 |
| 4,294,331 | A | * | 10/1981 | Reynoir | A62B 1/00 114/264 |
| 4,369,538 | A | * | 1/1983 | Smedal | A62B 1/20 14/69.5 |
| 4,492,270 | A | | 1/1985 | Horton | |
| 4,506,735 | A | | 3/1985 | Chaudot | |
| 4,590,634 | A | | 5/1986 | Williams | |
| 4,669,917 | A | | 6/1987 | Sveen | |
| 4,793,418 | A | | 12/1988 | Chaudot | |
| 5,190,411 | A | | 3/1993 | Huete et al. | |
| 5,381,865 | A | | 1/1995 | Blandford | |
| 6,196,322 | B1 | | 3/2001 | Magnussen | |
| 6,263,971 | B1 | | 7/2001 | Du Petrole | |
| 2003/0188873 | A1 | | 10/2003 | Anderson et al. | |
| 2003/0205189 | A1 | | 11/2003 | Key | |
| 2008/0162085 | A1 | | 7/2008 | Clayton et al. | |
| 2010/0025043 | A1 | | 2/2010 | Ingebrigtsen et al. | |
| 2010/0071140 | A1 | | 3/2010 | Williamson | |
| 2012/0285656 | A1 | | 11/2012 | Moore | |
| 2012/0305262 | A1 | | 12/2012 | Ballard et al. | |
| 2012/0318529 | A1 | | 12/2012 | Herrold et al. | |
| 2013/0239868 | A1 | | 9/2013 | Luo | |
| 2013/0272821 | A1 | | 10/2013 | Ardavanis et al. | |
| 2013/0327535 | A1 | | 12/2013 | Lamison | |
| 2014/0077607 | A1 | | 3/2014 | Clarke et al. | |
| 2014/0344002 | A1 | * | 11/2014 | Masterlark | G06Q 10/06315 705/7.25 |
| 2015/0096485 | A1 | | 4/2015 | Morice, III et al. | |
| 2015/0128840 | A1 | | 5/2015 | Rijken et al. | |

FOREIGN PATENT DOCUMENTS

| | | | |
|---|---|---|---|
| CN | 202765242 | U | 3/2013 |
| CN | 103661827 | A | 3/2014 |
| CN | 203504195 | U | 3/2014 |
| CN | 103895828 | A | 7/2014 |
| CN | 203714155 | U | 7/2014 |
| EP | 2592318 | A1 | 5/2013 |
| EP | 2709054 | A1 | 3/2014 |
| EP | 3046206 | A1 | 7/2016 |
| EP | 3051124 | A1 | 8/2016 |
| GB | 2050995 | A | 1/1981 |
| GB | 2133446 | A | 7/1984 |
| GB | 2209781 | A | 5/1989 |
| GB | 2231905 | A | 11/1990 |
| KR | 20130042815 | A | 4/2013 |
| KR | 20140015949 | A | 2/2014 |
| MX | 2015000881 | A | 3/2015 |
| NO | 924962 | A | 6/1994 |
| NO | 20031506 | A | 1/2004 |
| RU | 2004 132 948 | A | 4/2004 |
| RU | 108981 | U1 | 10/2011 |
| WO | 0056982 | A1 | 9/2000 |
| WO | 0174473 | A1 | 10/2001 |
| WO | 2005045307 | A1 | 5/2005 |
| WO | 2007011237 | A2 | 1/2007 |
| WO | 2007055594 | A1 | 5/2007 |
| WO | 2009042307 | A1 | 4/2009 |
| WO | 2010020026 | A2 | 2/2010 |
| WO | 2015104173 | A2 | 7/2015 |
| WO | 2016028158 | A1 | 2/2016 |
| WO | 2016122334 | A1 | 8/2016 |
| WO | 2017048132 | A1 | 3/2017 |
| WO | 2017168143 | A1 | 3/2017 |
| WO | 2018052317 | A1 | 3/2018 |

OTHER PUBLICATIONS

Shetty et al., Fire safety assessment and optimal design of passive fire protection for offshore structures, Reliability Engineering and System Safety 61, 1998, pp. 139-149. (Year: 1998).*

Mould, G.I, "Assessing Systems for Offshore Emergency Evacuation," The Journal of Operational Research Society, vol. 52, No. 4, Apr. 2001, pp. 401-408. (Year: 2001).*

Harstad, E., Safety as an Integrated Part of Platform Design, Society of Petroleum Engineers, SPE 23519, First International Conference on Health, Safety and Environment, held in The Hague, The Netherlands, Nov. 10-14, 1991. (Year: 1991).*

International Search Report and Written Opinion, PCT/NO2017/050230, dated Nov. 7, 2017 (9 pp.).

GB1615681.2 Search Report, dated Mar. 13, 2017 (9 pp.).

Unmanned Wellhead Platforms, UWHP Summary Report, Ramboll, dated Mar. 17, 2016 (http://www.npd.no/Global/Norsk/3-Publikasjoner/Rapporter/Unmanned-wellhead-plafforms/ROGC-Z-RA-000027-1-003.pdf) (27 pp.).

Norsok Standard S-DP-001, Rev. 1, Design Principles Technical Safety, dated Dec. 1994 (54 pp.).

Young, P., Oman crude holds steady above $100 mark amid Crimea political crisis, Apr. 1, 2014 (2 pp.).

New North Sea Unmanned Platforms Save Cost and Could be Used More in the Future, Oil Industry News, Apr. 13, 2016 (2 pp.).

ScandinaviaMideast.com, DNO and RAK Petroleum complete MEAN Merger, Jan. 1, 2017 (2 pp.).

Eurasian Office Action, 201990722/31, dated Mar. 12, 2020 (2 pp.) (in English).

* cited by examiner

OPTIMISING FIRE PROTECTION FOR AN OFFSHORE PLATFORM

TECHNICAL FIELD

The present invention relates to a method for optimising fire protection for an offshore platform of an oil and gas installation and to an offshore platform with optimised fire protection. In example implementations the offshore platform is a production platform for an oil and gas installation.

BACKGROUND OF THE INVENTION

It is required for offshore platforms to be designed taking into account the possibility of a fire, and this is of particular relevance for oil and gas installations due to the presence of combustible hydrocarbons. Whilst steps are taken to minimise the risk of a fire occurring, it is also necessary to take account of a possible fire and the damage that it might cause. Fire protection is typically put in place to ensure the safety of personnel; to prevent escalation of the fire to other parts of the oil and gas installation, such as to the pipeline and wells; and to prevent structural damage to the platform itself. Existing oil and gas platforms make use of both Passive Fire Protection (PFP) and Active Fire Protection (AFP) as well as fire alarm systems to alert the operator to the presence of a fire.

PFP attempts to contain fires or slow the spread of fires through use of fire-resistant shielding, fire dampers, and intumescent products amongst other things. The PFP is inactive until a fire occurs, although it can need regular checking and/or maintenance, for example to ensure that fire resistant walls or seals are intact and have not degraded. When a fire occurs then PFP will react to the existence of the fire to help withstand the fire, for example by slowing transmission of heat between compartments, preventing movement of flames, restricting air-flow and so on. There are no systems to trigger the release of fire fighting agents or the like, as with AFP.

As the name suggests AFP generally involves the use of systems that are activated by the presence of a fire in order to protect against the fire, for example by suppression of the fire. Such systems include fire sprinkler systems, gaseous agents, or firefighting foam system. Automatic suppression systems are typically specified for high risk areas, such as refuges for personnel. As an AFP system will generally include some kind of consumable, such as water or other fire suppression agent, then it will require a reservoir or tank of some sort, as well as a distribution system. AFP is generally more complex than PFP, but can be more effective.

For an oil and gas platform the integrity of equipment and piping containing hydrocarbon is conventionally secured by a combination of depressurization (i.e. venting of the hydrocarbons) and PFP. The goal of this is to ensure that personnel can safely escape from the immediate area of the fire and, later on, evacuate the installation. The first phase is usually short, in the order of 5 minutes, but evacuation by lifeboat of 25 and upward people takes time, typically 40-60 minutes. This means that a fire must not be permitted to escalate to an intensity where the "safe" mustering area near the lifeboats would be threatened, i.e. vessels or large piping must not burst at elevated pressure.

SUMMARY OF THE INVENTION

Viewed from a first aspect, the invention provides a method for optimising fire protection for an offshore oil and gas platform, the platform having equipment and piping associated with an oil and gas installation, the method comprising: arranging the platform to have an evacuation time of at most 15 minutes or less using one or more evacuation route(s) via a gangway or bridge allowing personnel to escape to a vessel or to another platform; determining a maximum evacuation time for the platform; assessing the risk to personnel using the evacuation route(s) in accordance with the determined maximum evacuation time in the event of a fire; and providing passive fire protection to equipment and/or piping on the platform in order to prevent escalation of the fire that would create a risk to personnel on the evacuation route(s) during the determined maximum evacuation time.

This method allows for the amount of fire protection to be optimised such that it can be implemented at a minimum level based on the determined maximum evacuation time. In accordance with the method a small and compact platform can be developed with a minimal amount of fire protection. Of course, a safe platform could be easily provided with extra fire protection compared to the proposed optimised fire protection, but the inventors have realised that significant gains in efficiency are possible by the use of this method of optimisation. Advantageously, the passive fire protection may be provided only to the extent required to prevent escalation of the fire that would create a risk to personnel on the evacuation route(s) during the determined evacuation time. Thus, there may be no further passive fire protection on the platform. Preferably there is no active fire protection at all. By minimising the amount of fire protection then the maintenance required for the fire protection can be minimised, and the space needed on the platform can also be kept to a minimum. As well as this, the installation costs are reduced. The inventors have taken the non-obvious step of providing fire protection that is optimised based on evacuation and would effectively allow for the equipment on the platform to be sacrificed in the rare event of a fire, since provided the platform is kept safe for evacuation then further escalation may not be restricted by the fire protection.

In example embodiments the platform is an unmanned platform, for example an unmanned production platform, an unmanned wellhead platform, or a combined unmanned wellhead and production platform. That is to say, it is a platform that has no permanent personnel and may only be occupied for particular operations such as maintenance and/or installation of equipment. The unmanned platform may be a platform where no personnel are required to be present for the platform to carry out its normal function, for example day-to-day functions relating to handling of oil and/or gas products at the platform. In developing an unmanned platform it is a particular benefit for the maintenance hours to be kept to a minimum, since then the need for personnel on the platform is minimised. Therefore there is a synergy between the feature of an unmanned platform and optimisation of the fire protection.

A further synergy arises due to the realisation by the inventors that an unmanned platform can be operated on the basis that whenever personnel are present on the unmanned platform then there should always be a way for direct access and egress by the personnel via the gangway or bridge required in the method. Thus, the unmanned platform can easily satisfy the requirement for a gangway or a bridge since it may either be interconnected with another platform, with personnel escaping via a bridge for example, or it may only have personnel present when the vessel that provided transport for the personnel is also present and provides a part of the evacuation route(s). Thus, the method may involve evacuation route(s) making use of a so-called "Walk to Work (W2W)" system for example using a gangway from a service vessel.

In the case where the method involves the use of a bridge to another platform, then the other platform may typically be associated with the same oil and gas installation and it may be the same type of platform or a different type of platform. For example, the platform to be evacuated may be a production platform whereas another platform connected by a bridge may be a wellhead platform. In some cases both platforms may be unmanned platforms.

The length of the bridge may be set in order to provide a safe distance for evacuation, although it is envisaged that other factors will require a bridge to be of sufficient length, and probably longer than required. For example, the distance between platforms may need to be above a certain minimum based on allowing safe navigation of vessels. The length of the bridge may be about 50 m or above, optionally about 75 m or above.

An unmanned platform may be a platform with no provision of facilities for personnel to stay on the platform, for example there may be no shelters for personnel, no toilet facilities, no drinking water and/or no personnel operated communications equipment. The unmanned platform may also include no heli-deck and/or no lifeboat, and advantageously may be accessed in normal use solely by the gangway or bridge, for example via a Walk to Work (W2W) system as discussed above.

An unmanned platform may alternatively or additionally be defined based on the relative amount of time that personnel are needed to be present on the platform during operation. This relative amount of time may be defined as maintenance hours needed per annum, for example, and an unmanned platform may be a platform requiring fewer than 10,000 maintenance hours per year, optionally fewer than 5000 maintenance hours per year, perhaps fewer than 3000 maintenance hours per year. There is of course a clear inter-relationship between reducing the maintenance hours needed and the minimisation of fire protection, amongst other things. The current method is developed as a part of a general philosophy of minimising the amount of, and complexity of, the equipment on the unmanned platform, thereby allowing for the smallest and most cost effective platform for a given capability in terms of providing a function in the oil and gas installation. When reductions in the size of the platform are combined with the proposed method then further gains are realised, since the evacuation time is reduced and thus the amount of passive fire protection required by the method is also reduced.

The short evacuation time of a platform as in the proposed method, including where a vessel or another platform is coupled to the platform whenever there are personnel on board, hence allows an innovative approach. This approach can be further developed by the platform optionally having no mechanism for depressurisation of the hydrocarbon inventory in the event of a fire, or in some cases no depressurisation mechanism of any type. In some cases it may be useful to allow for a cold vent system for use in maintenance. It will be appreciated by those skilled in this filed that the platform may have a capability for a slow speed depressurisation for use in maintenance (for example over several minutes or hours), whilst also having no ability for emergency depressurisation, which should occur at high speed with emission of large amounts of hydrocarbons in a short space of time, within seconds for example. In example methods, there is advantageously no emergency depressurisation and thus there may be no flare, in particular there may be no hot flare and preferably no cold flare. For example there may be no large bore cold vent. The absence of depressurisation such as a flare can further reduce the size of the platform, and whilst this generates an added risk in the event of escalation of a fire the small size and small evacuation time means that the risk to personnel is avoided. The method may hence include the equipment and piping being left at operating pressure, and preferably being isolated from wells that are located subsea or at a separate structure and pipelines having large inventories of oil or gas. For example, isolation valves may be present at appropriate locations. The equipment and piping is not brought down to atmospheric pressure in the event of a fire, but instead an operating pressure is left in the system. The pressure may change as a result of operation of other equipment such as the isolation valves discussed below and/or a drain tank or similar.

In the event of a fire the time to escalation can be decreased compared to a similar platform with depressurisation. The operating pressure is not released, which means that the pipe stress will remain high or increase while the material ultimate tensile strength will decrease as it heats in the fire. Rupture will therefore occur sooner and at a higher pressure, causing the fire to escalate sooner than would be the case for a depressurised system. However, with the above method this is quicker time to rupture is acceptable. Due to the short evacuation time, the crew and the service vessel will still be at a safe distance when the escalation of the fire happens. For certain pipes and/or equipment passive fire protection will be required to extend the time before escalation and allow evacuation, but as explained above the amount of passive fire protection can be minimised.

The evacuation route(s) may include different routes from different locations on the platform to an escape point via the gangway or bridge. The platform may have just one gangway or bridge that is hence common to all evacuation route(s). In the case of a vessel connecting to the platform via a gangway then the evacuation route may include personnel boarding the vessel and moving away from the platform to a safe distance by using the vessel. In the case of a bridge, for example to another platform, then the evacuation route may include traversing some or all of the bridge to get to a safe distance. In determining the evacuation route(s) the method may include considering all possible locations for personnel on the platform, and the route(s) that these personnel may use to escape via the gangway or bridge. Identifying the evacuation routes can include taking account of the routes required for traversing decks, climbing and/or descending stairs, climbing and/or descending ladders, descending escape chutes and/or moving around obstructions. Obstructions might include equipment permanently on the platform with a location or a possible location that could block some routes, for example a crane that might obstruct a preferred evacuation route in some positions. Obstructions might also include temporary objects, such as objects being loaded onto or removed from the platform during installation or maintenance. Identifying the evacuation routes may also include taking account of routes that may not be available in the case of evacuation of injured personnel. The method may include identifying multiple possible evacuation routes for the different locations for personnel on the platform.

The method relates to a platform with an evacuation time that is at most 15 minutes. This hence puts some limitations on the size of the platform and on the accessibility and length of the evacuation route(s). The method includes determining a maximum evacuation time for the platform, and this is hence 15 minutes or below, but preferably is lower than this, for example the platform may be arranged to have a maximum evacuation time of 10 minutes or below, optionally about 7 minutes or below. Reducing the maximum evacuation time can be done by reducing the size of the decks of the platform, minimising the height between decks, reducing the number of decks, arranging the decks for direct access to exit each deck toward the escape route and so on. Those skilled in the art will appreciate that the variables relating to the maximum evacuation time can be controlled during design of the structure and layout of the platform, especially when there is a focus on minimising the amount of equipment that is present.

One possibility for minimising the size of the platform is to use a single main deck. In an example of this type, an offshore unmanned wellhead platform comprises: riser hang-off equipment for connection to at least one riser for flow of hydrocarbon fluids from at least one well; and process equipment for processing the hydrocarbon fluids to produce processed or part processed hydrocarbon fluids for storage and/or transport to another installation, wherein all of the process equipment is on a single process deck of the platform.

With this arrangement the platform is an unmanned platform and has essentially one main deck. Advantageously the platform may be a single-deck platform, comprising the single process deck and no further deck(s), aside from optionally a weather protection deck and/or a lower access level for maintenance as described below. All of the process equipment on the platform is located on the single process deck and thus may all be placed in essentially the same plane. This is in clear contrast to many known arrangements where multiple decks are used as mentioned above. Reducing the number of decks simplifies the construction of the platform and saves on costs and material usage as well as reducing the evacuation time. Placing all of the process equipment on a single process deck further simplifies the platform arrangement and may allow for more straightforward automation of the operation of the platform. These simplifications have a synergy with the additional proposed feature that the platform is unmanned (i.e. that it generally operates with no personnel present as discussed further below) since having a simpler platform reduces the need for maintenance operations and having a single process deck for all the process equipment can facilitate more straightforward automation of maintenance. For example, to move materials such as spare parts or consumables around a single process deck then a single remotely controlled handling system may be provided to move items horizontally around the single process deck and this will only need to operate in a restricted vertical extent, since a floor level for all of the process equipment may generally be in a single plane.

In example embodiments the single process deck is the main deck of the platform and there are no other decks for equipment relating to the processing or handling of hydrocarbon fluids. For example, there may be no other decks aside from one or more decks provided for the purpose of facilitating weather protection, materials handling and/or access to the single process deck.

The processing equipment may include equipment for processing or part processing the hydrocarbon fluids, such as equipment for water handling and separation for re-injection, hydrocarbon separation, and/or gas reinjection equipment such as via ESP. The platform may comprise ancillary equipment required for operation of the wellhead platform, and some or all of this ancillary equipment may be located on the single process deck along with the process equipment. For example, the platform may include an electrical cabinet and/or a hydraulic cabinet for holding an electrical and/or a hydraulic control system for the wellhead platform, and this cabinet is advantageously located on the single process deck. Example embodiments used an electrical system rather than a hydraulic system in order to allow for minimal maintenance and reduce the need for personnel to be present at the single deck platform.

Determining the maximum evacuation time can be done based on identifying the evacuation route requiring the longest evacuation time, and finding the evacuation time for that route. The method may include assessing evacuation time and/or the length of the route for all evacuation routes in order to identify the evacuation route with the longest evacuation time. The evacuation time can be calculated based on assessing the nature of each part of the evacuation route, allocating a time required for a person to traverse each part of the evacuation route, and summing the times. For example, an evacuation route may require personnel to cross one or more deck(s), ascend or descend one or more flights of stair(s), and cross a gangway or bridge. In the case of evacuation via a vessel then the evacuation route may include boarding a vessel, detaching the vessel from the platform and piloting the vessel away from the platform to a safe distance. The time required for a person to traverse each part of a route may be based on the length/distance for the route and on a set speed for different types of route. Preferably the speed is based on evacuation of an injured person. Optionally the speed may be based on favourable weather conditions. In the case of an unmanned platform personnel would not board the platform during adverse weather and therefore it may not be necessary for the speed during evacuation to take account of adverse weather. The speeds can be based on past experience and/or empirical calculations for speed of movement of a person.

The evacuation time may take into account the time required for all personnel on the platform to exit the platform. Multiple personnel may wish to use the same evacuation route, or the same part of a route, at the same time. For example, there may be a queue to board a vessel. The determination of the maximum evacuation time may be done on basis of a maximum number of people on the platform and may include taking account of the time required for this number of people to all complete certain stages of the evacuation route, for example using a ladder, boarding a vessel and so on. The method may include the platform having a maximum limit on the number of personnel present. For example the platform may always have no more than 20 people present at any one time, optionally no more than 15 people, and in some cases no more than 10 people. The method may include setting a maximum limit on the number of people permitted to be present in order to thereby control the evacuation time.

In addition to the time required to move from a location to a safe distance from the platform via an evacuation route the method may also include adding a time allowance for personnel to evaluate and understand the situation before a decision to escape the platform is made. As the platform is very limited and therefore complex thought should not be required to determine the best evacuation route then this time may be set at just a few seconds, for example as 15 seconds or less, or as 10 seconds or less. A further time allowance may be added for personnel to evaluate and address injuries to other personnel before evacuating along with the injured personnel. The maximum evacuation time may include these types of thinking time as well as the time needed to pass along the evacuation route.

The method may include using a speed for a person crossing a deck, for example a speed in the range of 0.3 to 0.7 m/s for an injured person being evacuated across a flat deck, optionally a speed in the range 0.4 to 0.6 m/s, for example a speed of 0.5 m/s. The same speed may be used for an injured person crossing a flat gangway or bridge. An adjusted speed may be used in the event that the evacuation route includes an inclined walkway such as an inclined gangway. The method may include using a speed for an injured person evacuating via ascending or descending stairs, for example a speed in the range of 0.1 to 0.3 m/s for stairs of standard size, for example a speed of 0.2 m/s. The method may include using a speed for an injured person evacuating via ascending or descending ladders, for example a speed in the range of 0.05 to 0.2 m/s, such as a speed of 0.1 m/s. Stairs of standard size may be defined as stairs with a maximum pitch of stairs not to exceed 38° and step height in the range of 12-22 cm. The method may allow a set time for particular actions during the evacuation, such as opening a barrier, boarding a vessel, detaching the vessel from the platform and so on, and these times may be determined based on past experience and/or testing. Where a vessel is involved then the method may include using a speed and/or a set time for piloting the vessel to a safe distance. This speed and/or time could be determined based on favourable weather conditions for the same reasons as above.

A maximum evacuation time can be determined based on the steps discussed above and this is then used in assessing the risk and determining the required passive fire protection. The step of assessing the risk to personnel using the evacuation route(s) in accordance with the determined maximum evacuation time in the event of a fire can include determining the likelihood of escalation that would affect the evacuation route(s) within the evacuation time. This may include taking account of the expected progression of evacuation of personnel along the evacuation route(s). For example, an increase in the level of danger at start of the evacuation route may be permitted once sufficient time has elapsed for personnel to have moved away from the immediate area. The method includes providing passive fire protection to equipment and/or piping on the platform in order to prevent escalation of the fire that would create a risk to personnel on the evacuation route(s) during the determined evacuation time. This step may include providing passive fire protection to the extent required to remove the risk to personnel on the evacuation route(s) during evacuation, and optionally the method may include only providing the passive fire protection to such an extent. By way of example, if there is a risk of escalation within the maximum evacuation time due to rupture of certain pipework in the vicinity of an escape route, or liable to affect an escape route then passive fire protection may be provided to restrict the increase in temperature of the pipework during a fire and/or to increase the strength of the pipework to make it more resistant to rupturing. Alternatively or additionally, if there is a risk of escalation within the maximum evacuation time due to hydrocarbons present in certain equipment in the vicinity of an escape route, or liable to affect an escape route then passive fire protection may be provided to restrict the increase in temperature of the equipment during a fire and/or to protect the equipment from to make it more resistant to ignition of the hydrocarbons and/or explosion of the equipment. Such equipment may include compressors, scrubbers, coolers, metering devices, valves and so on.

Another factor in prior art fire protection is avoidance of risk to the structural stability of the platform. This can provide benefits for the proposed method as well, although it will be appreciated that the decision could alternatively be taken to sacrifice the platform entirely in some cases, for absolute minimum fire protection despite a risk to the platform structure. In the case of a relatively compact platform even with the optional absence of depressurisation it is typically found that with appropriate isolation and hence containment of the hydrocarbon inventory, then the hydrocarbon inventory may be made small enough to permit it to burn out before any risk to the structural stability of the platform, whilst avoiding the need to add any further fire protection. Thus, in some examples, by including isolation of the hydrocarbon inventory then the method provides optimised fire protection both for the protection of evacuating personnel and for the protection of the platform structure.

The restriction on evacuation time in combination with the possible speed of movement of personnel during evacuation sets a limit on the size of the platform. The platform dimensions and layout may be determined with reference to this size. Alternatively or additionally the platform dimensions and layout may have other restrictions. In the latter case the platform may have five decks or fewer, thereby minimising the time required to move between decks. Alternatively or additionally the maximum vertical distance to travel between decks during an evacuation is at most 40 m, preferably no more than 30 m. Typically this would be between the uppermost deck and a lower deck from which personnel can exit the platform such as the cellar deck 106 or spider deck 102. Thus, the vertical extent between the uppermost deck and the deck from which personnel may exit the platform may be at most 40 m, preferably no more than 30 m. The decks may have a maximum length and/or width of less than 30 m, optionally less than 25 m and in some examples less than 20 m. For example the largest deck(s) may be a square or rectangle with both length and width of less than 25 m or optionally less than 20 m.

[Single Deck Features]

Viewed from a second aspect, the invention provides a platform for an offshore oil and gas installation, the platform comprising: equipment and piping associated with the oil and gas installation; a gangway and/or a bridge for connecting the platform to a vessel and/or another platform; and passive fire protection for at least some of the equipment and/or piping; wherein the platform is arranged to have an evacuation time of at most 15 minutes or less using one or more evacuation route(s) via the gangway or bridge allowing personnel to escape to a vessel or to another platform; and wherein the passive fire protection is installed on the equipment and/or piping in order to prevent escalation of the fire that would create a risk to personnel on the evacuation route(s) during a determined maximum evacuation time.

This platform may be a platform that is optimised in accordance with the method of the first aspect and may include features in accordance with any of the optional features set forth above. The passive fire protection may be provided only to the extent required to prevent escalation of the fire that would create a risk to personnel on the evacuation route(s) during the determined evacuation time and there may be no further passive fire protection on the platform. Preferably there is no active fire protection at all.

In example embodiments the platform is an unmanned platform, which may be as discussed above. The unmanned platform may have no provision of facilities for personnel to stay on the platform, for example there may be no shelters for personnel, no toilet facilities, no drinking water and/or no personnel operated communications equipment. The unmanned platform may also include no heli-deck and/or no lifeboat, and advantageously may be accessed in normal use solely by the gangway or bridge, for example via a Walk to Work (W2W) system as discussed above.

The platform may optionally have no mechanism for depressurisation of the platform's hydrocarbon inventory in the event of a fire, or in some cases no depressurisation mechanism of any type. Thus, there may be no flare for example. As discussed above, isolation valves may be present at appropriate locations in order to isolate the platform to prevent escalation of the fire to hydrocarbons away from the platform.

The evacuation route(s) can be as explained above, and thus may include different routes from different locations on the platform to an escape point via the gangway or bridge. The maximum evacuation time for the platform can be as discussed above, with the evacuation time for a given evacuation route being determined as described above.

The restriction on evacuation time in combination with the possible speed of movement of personnel during evacuation sets a limit on the size of the platform. The platform dimensions and layout may have been determined with reference to this size and/or based on absolute restrictions on size. Thus, the platform may have five decks or fewer. Alternatively or additionally the maximum vertical distance to travel between decks during an evacuation is at most 40 m, preferably no more than 30 m. Typically this would be between the uppermost deck and a lower deck from which personnel can exit the platform such as the cellar deck or spider deck. Thus, the vertical extent between the uppermost deck and the deck from which personnel may exit the platform may be at most 40 m, preferably no more than 30 m. The decks may have a maximum length and/or width of less than 30 m, optionally less than 25 m and in some examples less than 20 m. For example the largest deck(s) may be a square or rectangle with both length and width of less than 25 m or optionally less than 20 m.

BRIEF DESCRIPTION OF THE DRAWINGS

Certain embodiments of the present invention will now be described in greater detail by way of example only and with reference to the accompanying drawings in which.

DETAILED DESCRIPTION

The following is described in the context of a possible field development 10. A 6-slots subsea production system (SPS) 12 is proposed at a first remote site, A. Approximately 12 km away, within a second remote site, B, is proposed an Unmanned Wellhead Platform (UWP) 14 and an Unmanned Processing Platform (UPP) 16.

Figure 1:
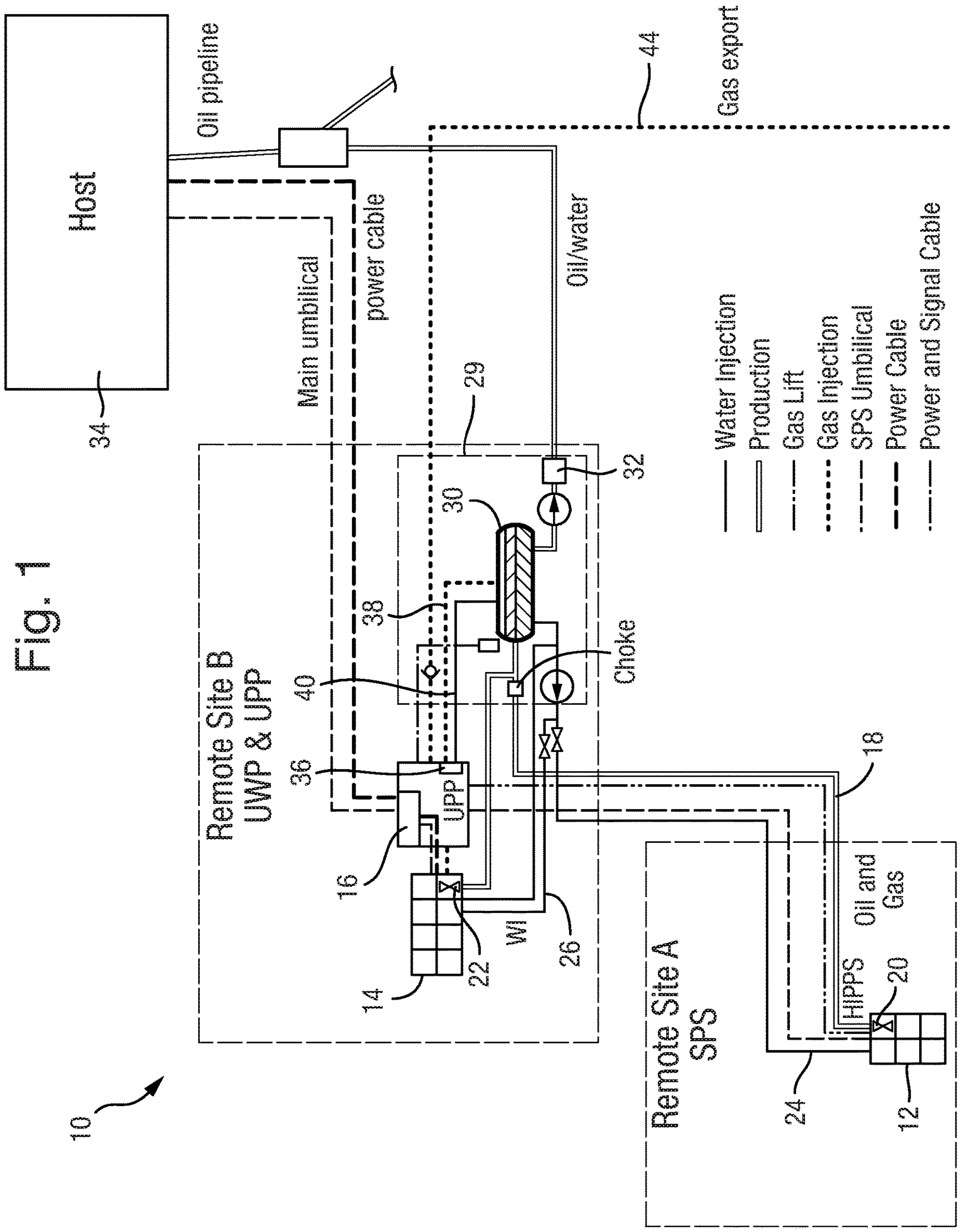
FIGS. 1 and 2 are schematic diagrams showing the layout of an offshore field development.
Figure 2:
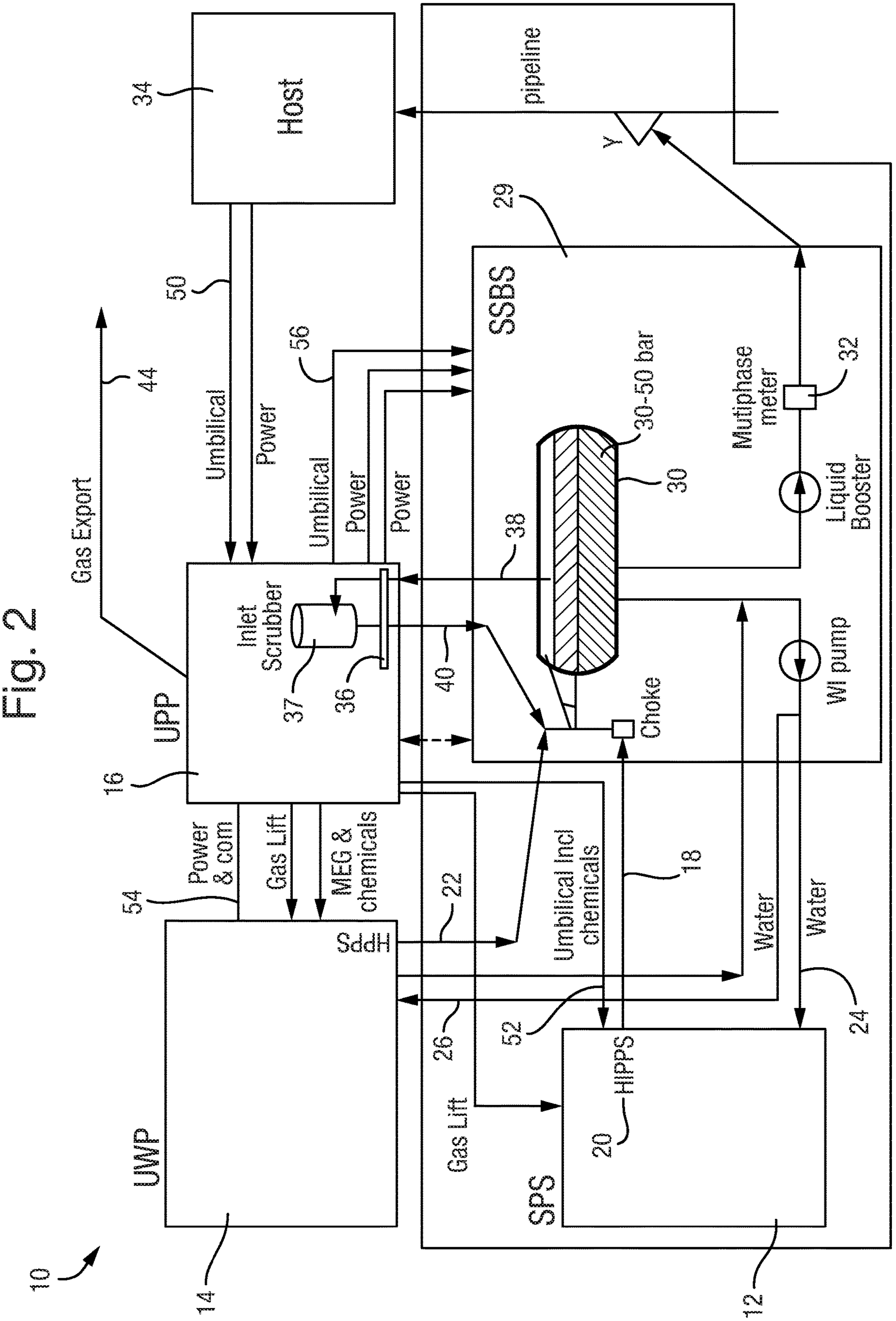

The distance between remote site A and remote site B is approximately 12 km, while the distance from remote site B to the tie-in point at a host pipeline is approximately 34 km. A schematic illustration of the pipeline systems is shown in FIGS. 1 and 2. The water depth both at remote site A and remote site B and in the host area is in the range of 100 to 110 metres, and the seabed bathymetry is in general flat with no major features or pockmarks.

Oil, gas and water from the reservoir of remote site A are produced to the SPS 12. The well fluid is transported through an insulated and heat traced pipe-in-pipe pipeline 18 to remote site B. The UPP subsea and topside facility 16 at remote site B is protected from the high well shut-in pressure by a subsea high-integrity pressure protection system (HIPPS) system 20.

Oil, gas and water from the reservoir of remote site B are produced to the UWP 14. The UPP subsea and topside facility 16 is protected from the high well shut-in pressure by a topside HIPPS system 22 on the UWP 14.

Injection of water for pressure support is planned for the reservoirs of both remote site A and remote site B via respective water injection pipelines 24, 26.

Produced fluid from remote site A and remote site B is mixed upstream of a subsea separator 30. The subsea separator 30 is a three phase separator operating at approximately 40 bar initially. The temperature in the separator 30 is high (90° C.) and good separation is expected.

Oil and water leaving the separator 30 is metered by a multiphase flow meter 32 and exported to a host 34. The receiving pressure at the host 34 will be kept at the same pressure as the subsea separator 30 to avoid flashing and multiphase flow in the export pipeline or inlet heater at the host 34. The oil is only partly stabilized in the subsea separator 30, and further stabilization to pipeline export specification is assumed at the host 34.

The subsea separator 30 and pumps (not shown) are provided as a subsea separator and booster station (SSBS) 29, which is located as close to the UPP 16 as possible to minimize condensation and liquid traps in the gas piping from the separator 30 to the UPP 16.

An umbilical 50 connects the UPP 16 to the host 34. The umbilical provides remote control of the operations of the UPP 16, as well as of the operations of the SPS 12, UWP 14 and SSBS 29 via secondary umbilicals 52, 54, 56. The secondary umbilicals 52, 54, 56 also supply any required power and chemicals required from the UPP 16 to the SPS 12, UWP 14 and SSBS 29.

Gas at 40 bar is delivered from the separator 30 to the UPP 16 topside inlet cooler 36 through a dedicated riser 38. The inlet cooler 36 comprises a seawater-cooled shell and tube heat exchanger. TEG is injected into the gas for hydrate inhibition before cooling the gas to 20° C. in the seawater-cooled shell and tube inter stage cooler 36. Condensed water and hydrocarbons are removed in a downstream scrubber 37.

Liquid from the scrubber 37 flows by gravitation back down to the subsea separator 30 through a dedicated riser 40.

The gas from the scrubber 37 is then compressed to around 80 bar in a first stage compressor with a discharge temperature of around 80° C. The temperature should ideally be as low as possible to reduce the amount of glycol required for dehydration.

The maximum cricondenbar pressure of the export gas is 110 barg. The cricondenbar is the pressure below which no liquid will be formed regardless of temperature. The cricondenbar is a property of the gas. The cricondenbar is determined by the conditions in the inlet scrubber 37.

The pressure in the scrubber 37 is determined by the pressure in the subsea separator 30. A low pressure in the separator 30 will reduce the flash gas in the export oil and is at some point in time required to realize the production profiles. The required compression work and power consumption will however increase with a lower pressure. The separator 30 will operate at about 40 bar initially and the pressure will be reduced to 30 bar or even lower towards the end of the lifetime.

The temperature in the scrubber 37 is determined by the inlet cooler discharge temperature. A lower temperature corresponds to a lower cricondenbar. The hydrate formation temperature is about 15° C. and a 5° C. margin gives a minimum cooler discharge temperature of 20° C.

The gas from the scrubber 37 is then dehydrated using the glycol dehydration to meet the appropriate export specification. For example, the maximum water content is 40 $mg/Sm^3$ for gas exported to Statpipe.

The gas is compressed to the required export pressure after dehydration. For example, the maximum operating pressure of the Statpipe Rich Gas pipeline is 167 barg. The required export pressure will be a function of allocated gas volumes and selected operational pressure in the pipeline and could be lower than the maximum pressure specified.

The gas is metered and measured according to requirements in a dedicated metering package, before entering the export riser and gas export pipeline 44.

In one example, the discharge temperature from the compressor is about 80° C. at 167 barg. However, the gas will be cooled in the 45 km long, un-insulated gas export pipeline 44 and the gas temperature is well below the maximum operating temperature for Statpipe when it reaches the tie-in point.

The selected UPP 16 design facilitates the unmanned processing of oil and gas in remote site B. A combination of subsea processing and topside processing on the UPP 16 can maximise operability and minimise capital and operational expenditure.

Figure 4:
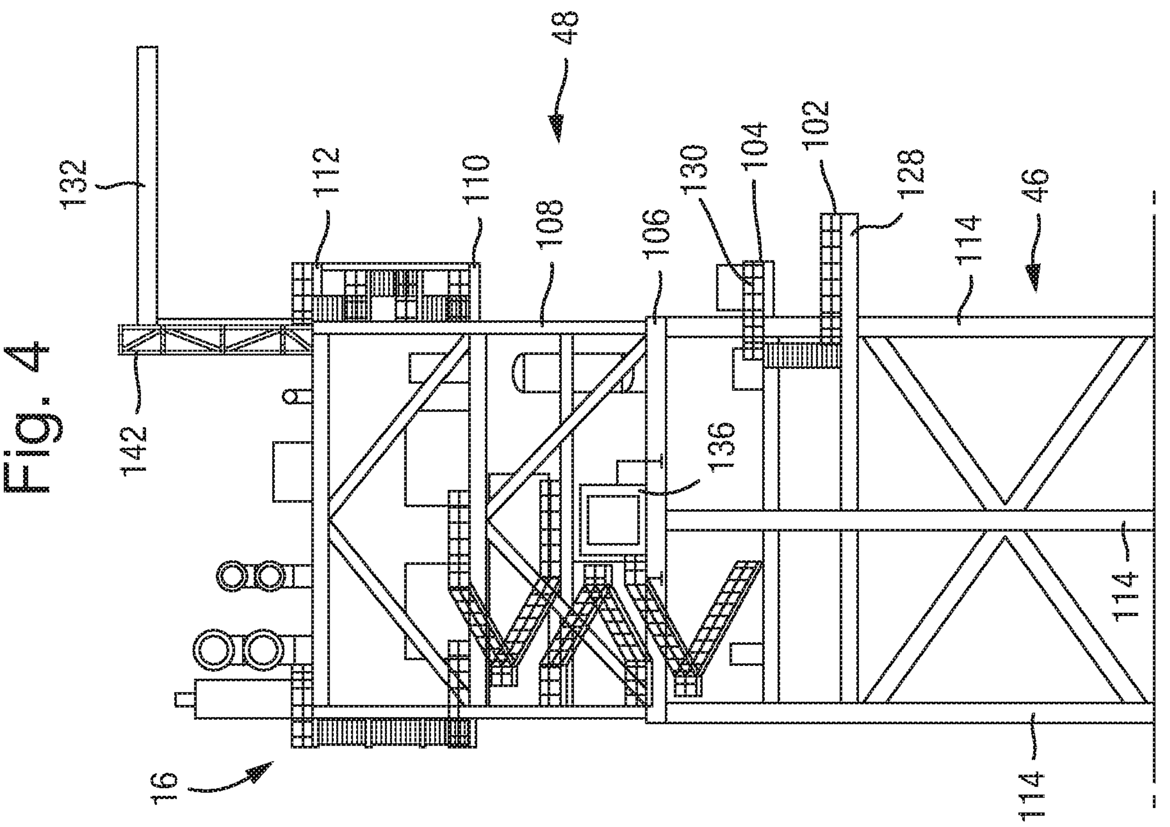
FIG. 4 is an elevation of another example platform when viewed from the north.
Figure 3:
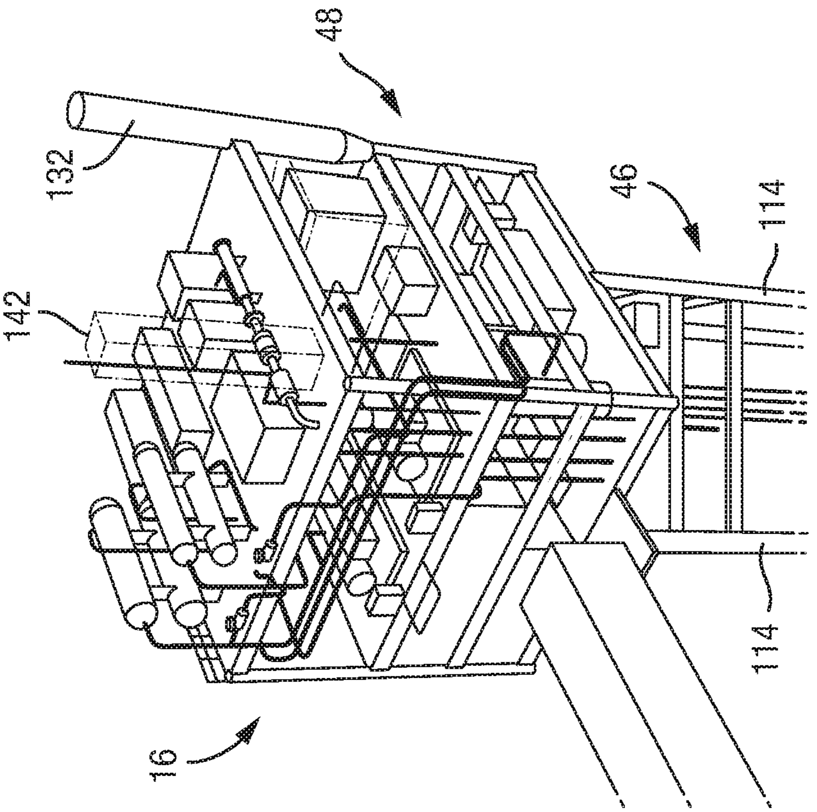
FIG. 3 is a perspective view of a 3D model of an example platform with a topside twisted 45° relative to the jacket.

The UPP 16 has a steel jacket configuration. The jacket 46 is square with a spacing of 14 metres between the support columns 114. The jacket orientation is turned at 45° to the platform north to optimise weight versus size for the topside 48, so that the topside decks 48 are at 45° to the square of the jacket 46, as shown in FIG. 3. By way of example, a possible UPP layout is shown in elevation in FIG. 4 and in plan view for each of the deck levels in FIGS. 5 to 10, which show the spider deck 102, emergency shutdown valve (ESDV) deck 104, cellar deck 106, cellar mezzanine deck 108, process deck 110 and weather deck 112 respectively.

The UPP 16 uses a piled, four legged, symmetrically battered jacket 46 to support the topside 48. The topside 48 is 19.8 m×19.8 m across the main structural span and its orientation is twisted compared to the jacket 46.

Umbilicals will be pulled into the platform 48 with a winch located on the weather deck 112 and a umbilical slot and reserved space are provided for this activity in centre of the platform 48. The slot and reserved space can be used for other purposes on the module deck areas once the pulling operation is completed.

The SSBS 29 is located on the seabed within the jacket 46. A subsea separator 30 is used instead of a topside solution on the UPP 16 because a topside solution would require an additional level on the UPP 16 due to the size and weight requirement.

The separator 30 is based on a symmetrical design with a central top inlet arrangement and top outlet arrangements at both ends combined with cyclones for gas polishing. Likewise oil and water outlets are at the bottom part inside and outside respective baffle-plates. Operation of the subsea separator 30 is performed using several distinct control loops.

The levels in the separator 30 are measured by a profiler level detector system. Water level control will adjust speed of the water injection pump and the level of oil will adjust speed of the export pump. The pressure in the subsea separator 30 is adjusted by the speed of the 1st stage compressor (suction pressure control). The control loops will be closed at the host 34 using fiber optic cables in an umbilicals 50, 56.

The platform 14, 16 would be oriented based on the prevailing wind direction. For example, with the prevailing wind defined as north to south and west to east, the process equipment should be located on the east and southeast side of the platform to allow for good natural ventilation.

As noted above, the platform layout advantageously uses a twisted topside 48 as shown in FIG. 3, with the topside decks 102, 104, 106, 108, 110, 112 rotated at 45° to the jacket 46. In this case the topside decks 102, 104, 106, 108, 110, 112 can be oriented with the cardinal points so that the sides of the square decks 102, 104, 106, 108, 110, 112 face north, south, east and west, and the jacket 46 is rotated at 45° relative to this, so that the corners of the jacket 46 face north, south, east and west.

Figure 5:
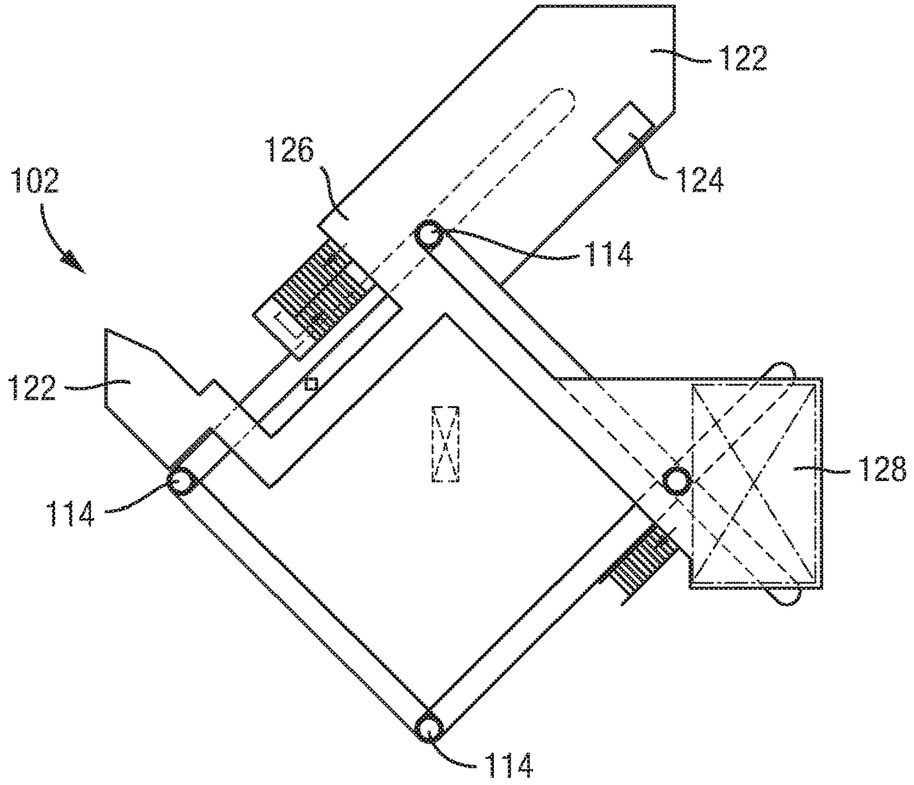
FIG. 5 shows a plan view for an example spider deck for the platform of FIG. 4.

The spider deck 102 is located at an elevation of 20 m above sea level. An example layout is shown in FIG. 5. The spider deck 102 will be provided with three of personnel landings 122 located on the north corner of the jacket 46 when the Service Operation Vessel (SOV) is located on the north and east side of the UPP 16 and on the west corner of the jacket 46 when the SOV is located on the west side of the UPP 16.

For the personnel landing 122 on the north corner a muster area 126 is defined. The muster area can be located below the module and close to the north staircase to the decks above. A temporary escape chute 124 will be located on the combined north-east personnel landing 122.

It is likely that the preferred side for a SOV is the east side of UPP 16 due to the prevailing wind direction. For this reason a laydown area 128 for material handling is located on this side. The laydown area 128 is 8×5 m. From the laydown area 128 stairs are provided up to ESDV deck 104. Between the personnel landings 122 and the laydown area 128, access and escape routes are provided.

The hang off arrangement for pipeline and risers that need 3D or 5D bend will be located on the spider deck 102. In addition is it likely that the umbilical and power cables should be hanged off at this level and routed directly up to the termination panels.

Figure 6:
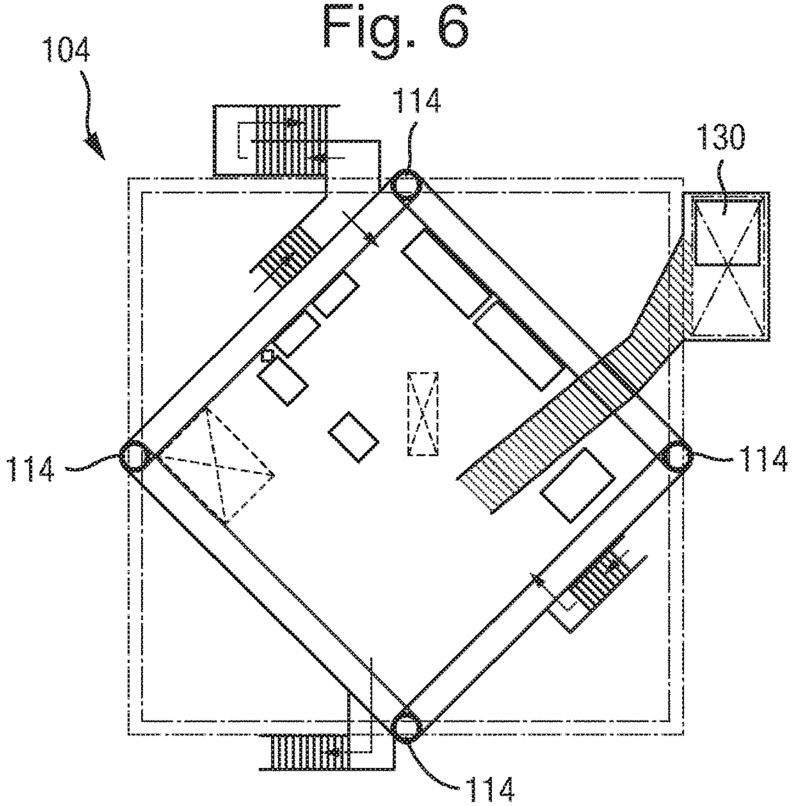
FIG. 6 shows a plan view for an example emergency shutdown valve (EDSV) deck for the platform of FIG. 4.

The ESDV deck 104, which can have a layout as shown in FIG. 6, is located 4 m above the spider deck 102. Piping that enters the UPP 16 from the subsea are routed inside the jacket structure 46. For piping with an ESD valve, the ESD valve shall be located on ESDV deck 104. The pipeline specification will be terminated at the ESD valve. Piping including ESD valve should be designed according to ASME design code B31.3 Process piping. ESD valves for the 16" gas export and the 16" process line from the subsea separator will be the largest valves on this deck 104, and the valves will most likely set the deck height pending the arrangement for material handling. Termination cabinets for the umbilical (TUTU) will be located on this deck 104, on the north and close to the Umbilical slot. Two seawater pumps including strainers and hydraulic skid will be located on the west side of this deck together with a stacking area for seawater lift pump.

A temporary and removable open drain tank is located on the ESDV laydown area 130. The laydown area 130 is sized (5×2.5 m) to allow for material handling when the drain tank is on the laydown area 130. The crane operator will have direct view and good accessibility with the weather deck crane 132.

The TEG circulation pump (24P0002) is located on east side of the deck and below the 2nd stage scrubber to allow for sufficient pump suction height (6 m). Access to Cellar deck 106 above will be from north and south end of the ESDV deck 104 using the stair cases.

Figure 7:
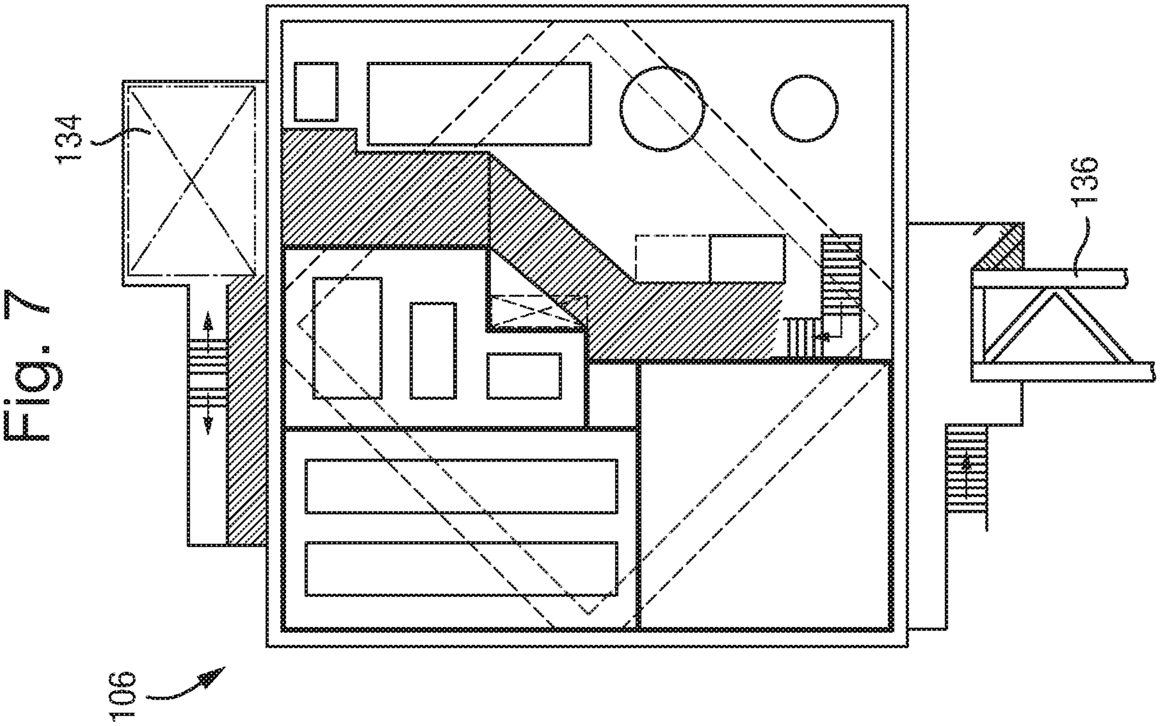
FIG. 7 shows a plan view for an example cellar deck for the platform of FIG. 4.

An example layout for the cellar deck 106 is shown in FIG. 7. In this example the Cellar deck 106 is located 6m above the ESDV deck 104. Access to cellar deck 106 is through a stair case on the north side from both the process deck 110 above and the ESDV deck 104 below. The stair case is in connection with the cellar deck laydown area 130. The south stair from the above and below area will land close to the bridge. From a north laydown area 134 to a bridge 136 on the south side is a main escape route connecting the staircases through the platform decks 102, 104, 106, 108, 110, 112. The bridge 136 is 75 m long and will tie the UPP 16 to the UWP 14.

On the north is a laydown area 134 (6×4 m) that will be designed to take the weight and size of the main power transformer located close to the laydown area 134. The transformers are the largest and heaviest equipment on this deck 106. Due to the large equipment maintenance handling route is dimensioned to take this large equipment. The high voltage transformers are located in a natural ventilated area that will be normally locked and only available for authorized personnel.

On the northwest side of the deck 106 is a mechanical ventilated Compressor VSD room. The access to the VSD room is from the process area and air lock in the centre of this deck 106 or from the north end of the room. Larger items that shall be removed from the room will be removed through the north access and skidded to the laydown 134.

A HVAC room is located on the south west side with access doors from east and south in addition will safe access be provided from the air lock used for access to the electrical VSD room. Larger items that need to be replaced could be handled through the east and follow the material handling route to the laydown area. The air intake for the HVAC room is proposed located on the cellar deck 106 west wall and the intake filter packing shall be designed <25 kg to enable manual handling.

Figure 8:
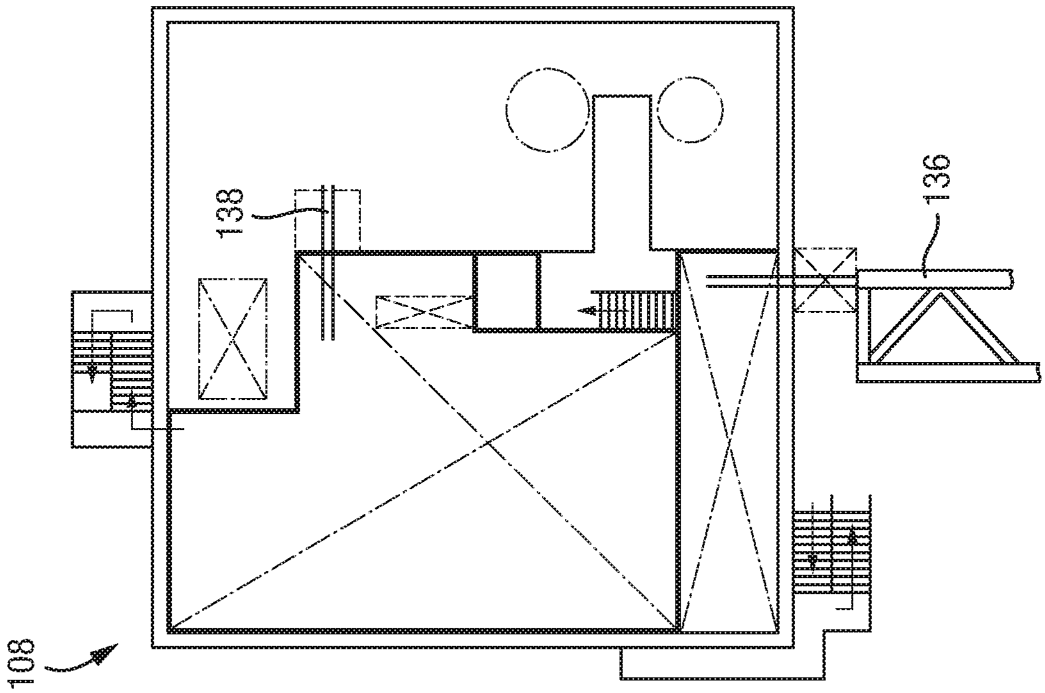
FIG. 8 shows a plan view for an example cellar deck mezzanine for the platform of FIG. 4.

Process equipment is located on east side of the module including scrubbers, pump and the fiscal metering package. A stair to a mezzanine deck 108 is provided in the centre of the module to avoid passage through the local instrument room when accessing to the local electrical equipment room. An example layout for the cellar mezzanine deck 108 is shown in FIG. 8.

The cellar deck mezzanine deck 108 is 4.6 m above the cellar deck 106 in this example. Access to the deck below and the deck above is arranged for by the north and south staircase, in addition to the internal south stair. A local instrument room with natural ventilation is on the south part of this mezzanine deck 108. Access can be provided from a stair on the south end or through the stair on the north east corner of the room. Material handling may be provided with a monorail and hoist 138 through a panel and to a drop area on the south east side and down to the east side of the bridge landing.

The local equipment room is mechanical ventilated for non-Ex approved equipment and are provided with air lock when entered from the east stair close to the process equipment. On the north access is provided directly into the north staircase. No deck is provided over the process area and large equipment, however from the mezzanine deck 108 a platform is arranged for access to the elevated part of the scrubbers.

Figure 9:
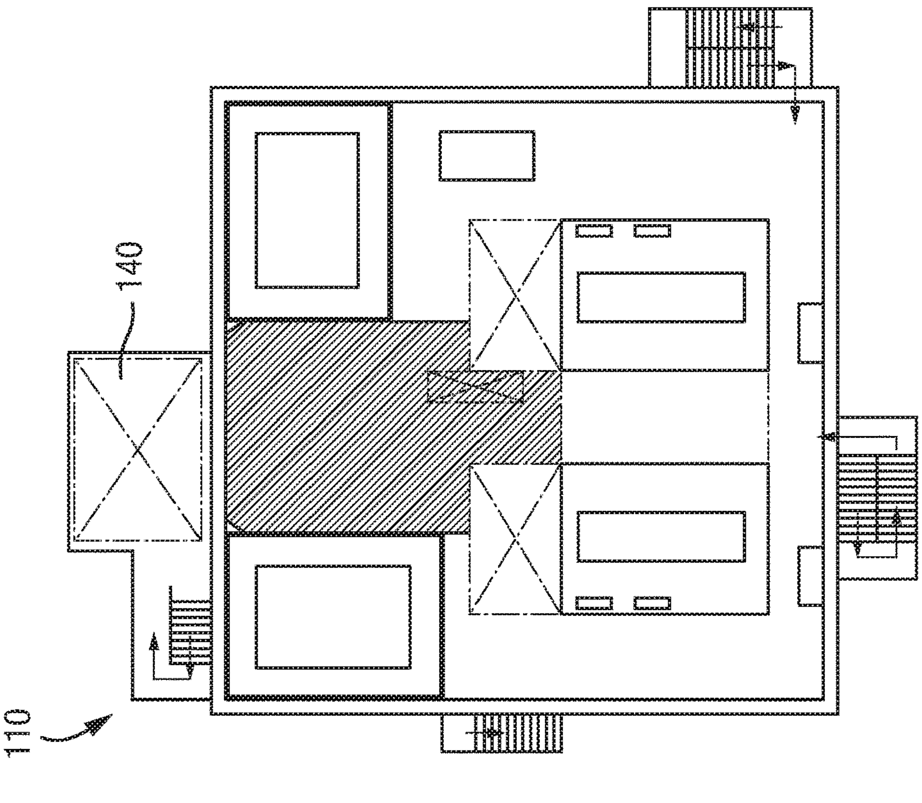
FIG. 9 shows a plan view for an example process deck for the platform of FIG. 4.

Above the cellar deck 106 and cellar deck mezzanine 108 is a process deck 110, which may be arranged as shown in FIG. 9. In this example the process deck 110 is located 9m above the cellar deck 106. Access to the deck below is arranged for by the north and south staircase. Access to the weather deck 112 is arranged on the east and west side.

A laydown area 140 (6×4 m) with crane access is located on the north end of the process deck 110 with a short transport route for the 1st and 2nd stage compressor transformers. Each transformer will have a weight of approximately 25 ton and need to be handled by a heavy lift vessel during installation due to the SOV crane limitation of 8-10 ton. Gas to Pipe Mixer (G2P™) and Inlet De-liquidizer's are located on the east side of the process deck 110.

Figure 10:
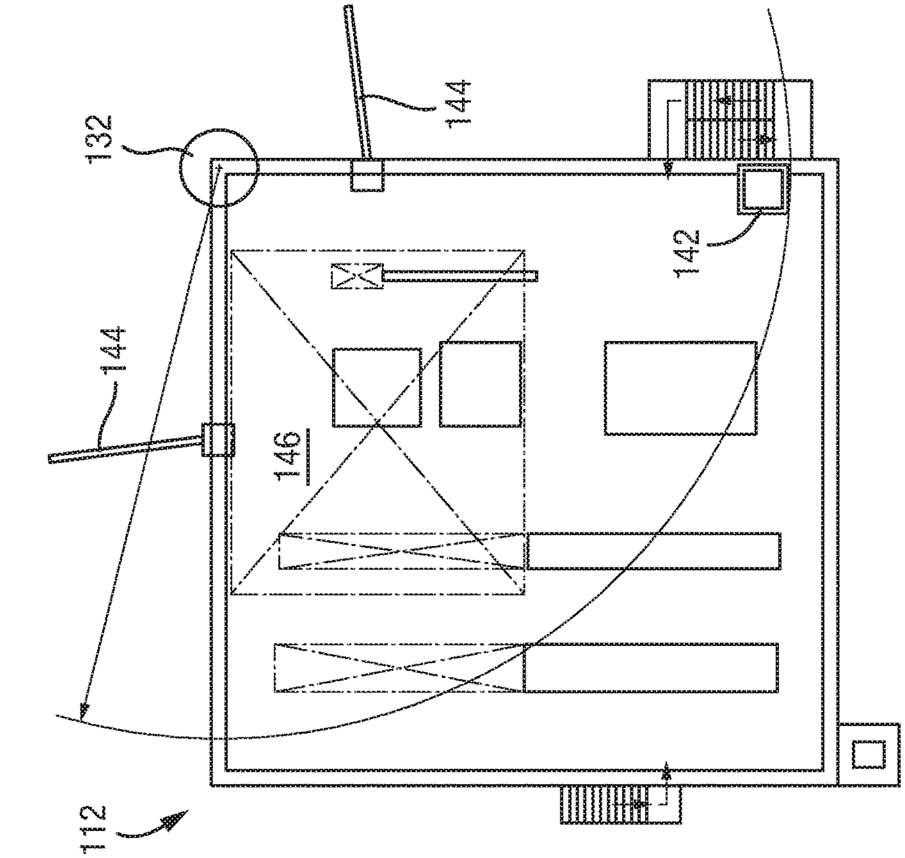
FIG. 10 shows a plan view for an example weather deck for the platform of FIG. 4.

The weather deck 112 is 8 m above the process deck 110 in this example and can have a layout as shown in FIG. 10. From this deck the access and escape possibilities are through stairs case on the east and west side of the installation and down to the cellar deck 106. The main equipment on the weather deck 112 is an intercooler heat exchanger and inlet gas heat exchangers. Dual heat exchangers will be stacked on top of each other on the south west deck area. A package with chemical tanks and pump may be required pending the supply of chemicals from OFC through the umbilical.

The vent stack 142 is located on the south-east corner due to the prevailing wind direction and to be close to process equipment for shortest possible pipe routing. Relief valves for the vent line will be located close to the vent stack 142. In this example the size of the stack is 1.5×1.5×10 m. The vent stack 142 is used for cold venting during certain procedures, and it is not used for depressurisation in the event of a fire. The vent stack 142 can be used for pressure relief of methane gas through cold vent 142 during barrier testing and maintenance operations that require pressure relief. It will be appreciated that there is no flare for this platform 16, which is a significant difference to the conventional arrangement. In the event of a fire there is no emergency depressurisation and instead the piping and equipment on the platform 16 is isolated from wells and larger volumes of hydrocarbons in connected external piping by valves, then left at operating pressure. As discussed above this generates an added risk in relation to escalation of the fire, but this risk can be managed by restricting the size of the platform 16 and hence minimising the evacuation time, and also by adding passive fire protection as described below.

The platform crane 132 is located on the north east corner for good access to all the laydown areas 128, 130, 134, 140 provided on the various decks below. This has an 18 m reach and the access to the laydown areas 128, 130, 134, 140 as well as to the SOV is aided by the twisted topside arrangement of the platform 16.

Goods lifted by the SOV to the spider deck laydown area 128 can be picked up by the platform crane 132 and moved to a local laydown area 130, 134, 140. In case of a breakdown of the platform crane 132, davits 144 are proposed installed between the two laydown areas 134, 140 on the north side and between the two laydown areas 128, 130 on the east side.

An area 146 on the weather deck 112 can be reserved for helicopter drop, although it will be appreciated that the platform design does not allow for a heli-deck.

Material from drop areas on cellar deck 106 could be moved to the north laydown area 134 with a trolley. Similarly, hand-liftable equipment on all decks can be transported by trolley to the local laydown area for further transportation.

The base case for equipment transfer from/to the UPP 16 is by mean of SOV crane used during normal scheduled visits in the operation phase. Cargo and equipment transport to and from the platform uses the SOV crane to the lowermost laydown area 128 on the spider deck 102. This is at a height of 20 m above sea level on both the UWP 14 and UPP 16. The maximum load for the SOU crane will typically be 10 tons at 20 m height and up to 3 m Hs. Loads below twenty five kilograms can be handled by the members of the crew through the W2W (SOV).

Loads up to three tons could alternatively be transferred by means of helicopter to a laydown area 146 on the weather deck 112. The weather deck 112 can contain a landing area 146 for cargo from helicopter and a personnel winch-up area for escape in a situation without access to the SOV.

Internal lifting on the UPP 16 is performed by a slewing jib crane 132, which is mounted on the weather deck 112 as noted above. The jib crane 132 in this example has a SWL capacity of 10 tons at 18 m distance along the jib. A similar design can be used for the UWP 14. Transport to/from the laydown area 128 on the spider deck 102 to the platform decks 104, 106, 108, 110, 112 can be done via the platform crane 132 to laydown areas 130, 134, 140 outside of the decks 104, 106, 108, 110, 112. This crane 132 is for onboard lifting only and all laydown areas 128, 130, 134, 140, 146 are arranged to be within reach of the crane 132. Advantageously, this crane 132 is only required during favourable weather since in the case of adverse weather then personnel will not visit the platform 16. This means that there is a lesser requirement for the capability of the platform crane 132 to operate in bad weather. Similarly, the SOU crane need not be capable of operating in bad weather. For example, the cranes need not meet the requirements of BS EN 13852-1 in relation to operation offshore in significant wave heights, such as operating at wave heights as large as 5 to 6 m. Instead the platform crane and also the SOV crane may only be required to operate at wave heights of up to 2 m.

Lifts above 10 tons could be performed by a separate heavy lifting vessel, although equipment weighing only slightly above 10 tons might be handled by the SOV crane with more stringent restrictions to wave height, but this will depend on the actual capacity of the crane on the vessel utilized.

Heavier equipment items are placed such that it is possible to lift them out of position and transport them to an external laydown area where they can be picked up by a suitable lifting vessel. Internal transport can be by lifting beams or monorails and rail based trolleys capable of handling the relevant load. Lifting/transport devices can be brought onto the platform as required for the relevant operation.

All vertical transport between decks is done by the platform crane 132, at least for larger items. As an alternative lifting arrangement for smaller items there are two davits 144 on weather deck level, one serving the east side covering laydown areas on the spider deck 102 and ESDV deck 104, and the other on the north side covering laydown areas on the process deck 110 and the cellar deck 106.

Local handling for each item will involve the use of permanently installed pad eyes and monorails and temporary equipment. It shall be possible to install trolley/hoists without use of temporary scaffolding. The platform 16 is designed for internal horizontal transport handling from laydown areas to/from location where the items are needed.

The lifting equipment that is used is advantageously of modular and temporary design and is to be stored, maintained and inspected onshore to reduce the maintenance hours required offshore. This lifting equipment can be transported to the platform via the SOV (or over the bridge 136, if a bridge 136 is present). Only the weather deck jib crane 132, lifting lugs and monorails are permanently on the platform. Jib crane moving parts should as far as possible be modular based and removable so that they can be stored and maintained onshore. It is preferred for only the parts too heavy to be removed to be kept on the jib crane and these should be suitable for prolonged storage in harsh conditions with minimum maintenance.

The platform 16 will allow for various evacuation routes from differing locations. The evacuation routes need to be established with the slowest evacuations being used as the basis for a maximum evacuation time. This maximum evacuation time is then used in determining what fire protection should be included. The platform 16 is provided with passive fire protection (PFP) in order to ensure that a fire will not escalate until after personnel on the platform have been safely evacuated. It should be noted that the absence of a flare can increase the risk of a dangerous escalation of a fire, since there is no depressurisation. However, the absence of the flare contributes to allowing for the size of the platform 16 to be reduced and the evacuation time to be minimised. Moreover since the platform 16 is an unmanned platform then personnel will only be present with a connection via a bridge 136 or a gangway to a SOV being present as well, which means that the evacuation process can be very quick. It is evaluated that personnel can escape to the stair tower within 1 minute after the initial incident, and a conservative assumption is that personnel will be on the service ship within 10 minutes.

The evacuation route(s) can include different routes from different locations on the platform 16 to an escape point via the gangway or bridge 136. In the case of a vessel connecting to the platform 16 via a gangway then the evacuation route includes personnel boarding the vessel and moving away from the platform to a safe distance by using the vessel. In the case of a bridge 136, for example to another platform such as the UWP 14, then the evacuation route may include traversing some or all of the bridge 136 to get to a safe distance. Identifying the evacuation routes includes taking account of the routes required for traversing decks, climbing and/or descending stairs, climbing and/or descending ladders, descending escape chutes and/or moving around obstructions. The evacuation time and/or the length of the route is assessed for all evacuation routes, or at least for the longest routes, in order to identify the evacuation route with the longest evacuation time. The evacuation time is calculated based on assessing the nature of each part of the evacuation route, allocating a time required for a person to traverse each part of the evacuation route, and summing the times. The time required for a person to traverse each part of a route is based on the length/distance for the route and on a set speed for different types of route. Preferably the speed is based on evacuation of an injured person. Optionally the speed may be based on favourable weather conditions. In the case of an unmanned platform personnel would not board the platform during adverse weather and therefore it may not be necessary for the speed during evacuation to take account of adverse weather. The speeds can be based on past experience and/or empirical calculations for speed of movement of a person.

By way of example, the speed of movement may be set as follows:

Evacuation of uninjured person: 1.0 m/s for corridors (flat decks), 0.6 m/s for stairs and 0.3 m/s for ladders.

Evacuation of injured person: 0.5 m/s for corridors, 0.2 m/s for stairs and 0.3 m/s for ladders.

The example platform above is about 20 m by 20 m with three full decks 106, 110, 112 and one mezzanine deck 108, plus two decks 102,104 as a part of the jacket structure. The jacket 46 is about 18 m by 18 m. The longest evacuation route is determined to be from the weather deck 112 to the SOV. Conservatively, the distance diagonally across the deck is used. The escape route is hence as follows: walk diagonal across deck—28 m, walk via stairs from weather deck 112 to bridge deck (spider deck 102)—91 m (based on height of 27 m and stair pitch not to exceed 38°), and walk from bridge deck to SOV—30 m.

Using the speeds set out above, the evacuation time for non-injured and injured personnel can then be found. For a non-injured person the timings are: walk diagonal across deck—28 s, walk via stairs from weather deck 112 to bridge deck (spider deck 102)—152 s, and walk from bridge deck to SOV—30 s, with a total time of 210 s. For evacuating an injured person the timings are: walk diagonal across deck—56 s, walk via stairs from weather deck 112 to bridge deck (spider deck 102)—456 s, and walk from bridge deck to SOV—60 s, with a total time of 572 s.

In an alternative scenario the evacuation route could be via the bridge 136 to the neighbouring platform. By way of example, it is required that the personnel traverse the full length of the bridge 136 to be deemed 'safe', and in this instance the bridge 136 is located at the cellar deck 106. The escape route is hence as follows: walk diagonal across weather deck 112—28 m, walk via stairs from weather deck 112 to cellar deck 106—57 m, and walk from cellar deck 106 across bridge 136—75 m.

Using the speeds set out above, the evacuation time for non-injured and injured personnel can then be found. For a non-injured person the timings are: walk diagonal across weather deck 112—28 s, walk via stairs from weather deck 112 to cellar deck 106—96 s, and walk across bridge 136—75 s, with a total time of 199 s. For evacuating an injured person the timings are: walk diagonal across weather deck 112—56 s, walk via stairs from weather deck 112 to cellar deck 106—287 s, and walk across bridge 136—150 s, with a total time of 493 s.

The evacuation time is used in assessing the risk and determining the required passive fire protection. Passive fire protection is provided to equipment and/or piping on the platform in order to prevent escalation of the fire that would create a risk to personnel on the evacuation route(s) during the determined evacuation time. For minimum fire protection this includes providing passive fire protection only to the extent required to remove the risk to personnel on the evacuation route(s) during evacuation. Thus, if there is a risk of escalation within the maximum evacuation time due to rupture of certain pipework in the vicinity of an escape route, or liable to affect an escape route then passive fire protection is provided to restrict the increase in temperature of the pipework during a fire and/or to increase the strength of the pipework to make it more resistant to rupturing. Alternatively or additionally, if there is a risk of escalation within the maximum evacuation time due to hydrocarbons present in certain equipment in the vicinity of an escape route, or liable to affect an escape route then passive fire protection is provided to restrict the increase in temperature of the equipment during a fire and/or to protect the equipment from to make it more resistant to ignition of the hydrocarbons and/or explosion of the equipment. Such equipment may include compressors, scrubbers, coolers, metering devices, valves and so on.

It will be appreciated that the above system for optimisation of fire protection could also be applied to the UWP 14 in a similar fashion. It will also be understood that the exact layout for the platform in terms of the decks that are present and the equipment that is used can vary.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A method for optimising fire protection for an offshore oil and gas platform, the platform having equipment and piping associated with an oil and gas installation, the method comprising:

arranging the platform to have an evacuation time of at most 15 minutes or less using one or more evacuation route(s) via a gangway or bridge allowing personnel to escape to a vessel or to another platform;

determining a maximum evacuation time for the platform using one or more of: a speed for a person crossing a deck; a speed for an injured person evacuating via ascending or descending stairs; a speed for an injured person evacuating via ascending or descending ladders; and/or a set time for particular actions during the evacuation, such as opening a barrier, boarding a vessel and/or detaching the vessel from the platform;

assessing the risk to personnel using the evacuation route(s) in accordance with the determined maximum evacuation time in the event of a fire; and providing passive fire protection to equipment and/or piping on the platform in order to prevent escalation of the fire that would create a risk to personnel on the evacuation route(s) during the determined maximum evacuation time;

wherein the passive fire protection is provided only to the extent required to prevent escalation of the fire that would create a risk to personnel on the evacuation route(s) during the determined maximum evacuation time; and wherein a speed for a person crossing a deck comprises a speed in the range of 0.3 to 0.7 m/s for an injured person being evacuated across a flat deck.

2. A method as claimed in claim 1, wherein there is no further passive fire protection on the platform.

3. A method as claimed in claim 1, wherein there is no active fire protection on the platform.

4. A method as claimed in claim 1, wherein the platform is an unmanned platform with no permanent personnel and requires personnel to be present for fewer than 10,000 maintenance hours per year, and wherein the platform has no provision of facilities for personnel to stay on the platform.

5. The method of claim 4, wherein the platform has no provision of facilities for personnel to stay on the platform comprises no shelters for personnel, no toilet facilities, no drinking water, no personnel operated communications equipment, no heli-deck, or no lifeboats.

6. A method as claimed in claim 1, wherein the evacuation route(s) make use of a Walk to Work system.

7. A method as claimed in claim 1, wherein the evacuation route(s) include different routes from different locations on the platform to an escape point via the gangway or bridge and the method includes identifying multiple possible evacuation routes for the different locations for personnel on the platform in order to find the maximum evacuation time.

8. A method as claimed in claim 1, wherein the maximum evacuation time is reduced by reducing the size of the decks of the platform, minimising the height between decks, reducing the number of decks, and arranging the decks for direct access to exit each deck toward the escape route.

9. A method as claimed in claim 1, wherein the maximum evacuation time is calculated based on assessing the nature of each part of the longest evacuation route, allocating a time required for a person to traverse each part of the evacuation route, and summing the times; and wherein the time required for a person to traverse each part of a route may be based on the length/distance for the route and on set speeds for different types of route based on evacuation of an injured person.

10. A method as claimed in claim 9, wherein in addition to the time required to move from a location to a safe distance from the platform via an evacuation route the method includes adding a time allowance for personnel to evaluate and understand the situation before a decision to escape the platform is made and a time allowance for personnel to evaluate and address injuries to other personnel before evacuating along with the injured personnel.

11. A method as claimed in claim 1, including isolation of a hydrocarbon inventory on the platform during a fire.

12. A method as claimed in claim 1, wherein the platform has five decks or fewer, wherein the vertical extent between the uppermost deck and the deck from which personnel may exit the platform is at most 40 m, and wherein all decks of the platform have a maximum length and width of less than 30 m.

13. A method for optimising fire protection for an offshore oil and gas platform, the platform having equipment and piping associated with an oil and gas installation, the method comprising:

arranging the platform to have an evacuation time of at most 15 minutes or less using one or more evacuation route(s) via a gangway or bridge allowing personnel to escape to a vessel or to another platform;

determining a maximum evacuation time for the platform using one or more of: a speed for a person crossing a deck; a speed for an injured person evacuating via ascending or descending stairs; a speed for an injured person evacuating via ascending or descending ladders; and/or a set time for particular actions during the evacuation, such as opening a barrier, boarding a vessel and/or detaching the vessel from the platform;

assessing the risk to personnel using the evacuation route(s) in accordance with the determined maximum evacuation time in the event of a fire;

providing passive fire protection to equipment and/or piping on the platform in order to prevent escalation of the fire that would create a risk to personnel on the evacuation route(s) during the determined maximum evacuation time;

wherein the passive fire protection is provided only to the extent required to prevent escalation of the fire that would create a risk to personnel on the evacuation route(s) during the determined maximum evacuation time; and wherein a speed for an injured person evacuating via ascending or descending stairs comprises a speed in the range of 0.1 to 0.3 m/s.

14. A method for optimising fire protection for an offshore oil and gas platform, the platform having equipment and piping associated with an oil and gas installation, the method comprising:

arranging the platform to have an evacuation time of at most 15 minutes or less using one or more evacuation route(s) via a gangway or bridge allowing personnel to escape to a vessel or to another platform;

determining a maximum evacuation time for the platform using one or more of: a speed for a person crossing a deck; a speed for an injured person evacuating via ascending or descending stairs; a speed for an injured person evacuating via ascending or descending ladders; and/or a set time for particular actions during the evacuation, such as opening a barrier, boarding a vessel and/or detaching the vessel from the platform;

assessing the risk to personnel using the evacuation route(s) in accordance with the determined maximum evacuation time in the event of a fire;

providing passive fire protection to equipment and/or piping on the platform in order to prevent escalation of the fire that would create a risk to personnel on the evacuation route(s) during the determined maximum evacuation time;

wherein the passive fire protection is provided only to the extent required to prevent escalation of the fire that would create a risk to personnel on the evacuation route(s) during the determined maximum evacuation time; and wherein a speed for an injured person evacuating via ascending or descending ladders comprises a speed in the range of 0.05 to 0.2 m/s.

* * * * *